US012675991B2

(12) United States Patent
Abeywardena et al.

(10) Patent No.: US 12,675,991 B2
(45) Date of Patent: Jul. 7, 2026

(54) ASSET LOCALIZATION WITH UNMANNED AERIAL VEHICLE

(71) Applicant: WING AVIATION LLC, Mountain View, CA (US)

(72) Inventors: Dinuka Abeywardena, Mountain View, CA (US); Travis DeJournett, Sunnyvale, CA (US)

(73) Assignee: Wing Aviation LLC, Palo Alto, CA (US)

( * ) Notice: Subject to any disclaimer, the term of this patent is extended or adjusted under 35 U.S.C. 154(b) by 0 days.

(21) Appl. No.: 18/640,267

(22) Filed: Apr. 19, 2024

(65) Prior Publication Data

US 2025/0329158 A1 Oct. 23, 2025

(51) Int. Cl.
*G01S 19/48* (2010.01)
*G01S 19/26* (2010.01)
(Continued)

(52) U.S. Cl.
CPC ............ *G06V 20/17* (2022.01); *G05D 1/656* (2024.01); *G06V 10/443* (2022.01); *G06V 10/72* (2022.01); *G06V 10/764* (2022.01); *G06V 10/7715* (2022.01); *G06V 10/778* (2022.01); *G06V 10/95* (2022.01); *G06V 20/70* (2022.01); *B64F 1/35* (2024.01); *B64U 70/90* (2023.01);
(Continued)

(58) Field of Classification Search
CPC ...... G06V 20/17; G06V 10/443; G06V 10/72; G06V 10/764; G06V 10/7715; G06V 10/778; G06V 10/95; G06V 20/70; G06V 2201/10; G06V 10/44; G06V 10/757;

G06V 10/82; G06V 20/176; G05D 1/656; G05D 2109/254; B64F 1/35; B64U 70/90; B64U 2101/31
USPC .......................................................... 348/144
See application file for complete search history.

(56) References Cited

U.S. PATENT DOCUMENTS 9,580,173 B1    2/2017  Burgess et al.
10,269,147 B2   4/2019  Jones et al.
(Continued)

OTHER PUBLICATIONS

Miller A. et al: "Landing a UAV on a Runway Using Image Registration", 2008 IEEE International Conference on Robotics and Automation, May 19, 2008, pp. 182-187, XP031340150.
(Continued)

*Primary Examiner* — Susan E. Hodges
(74) *Attorney, Agent, or Firm* — Christensen O'Connor Johnson Kindness PLLC

(57) ABSTRACT

A technique for a UAV includes acquiring a query aerial image with an onboard camera of the UAV and a reference aerial image, the query aerial image including multiple instances of an asset and the reference aerial image including annotated pixels indicating an expected location and an identification for the multiple instances of the asset. The technique further includes identifying a plurality of corresponding pixels between the query aerial image and the reference aerial image, determining a homography transformation describing a relationship between the query aerial image and the reference aerial image, annotating the query aerial image to identify a first instance of the asset included in the multiple instances of the asset within the query aerial image, and instructing the UAV to perform an action associated with the first instance of the asset.

24 Claims, 9 Drawing Sheets

(51) Int. Cl.

| | | |
|---|---|---|
| *G01S 19/40* | (2010.01) | |
| *G05D 1/656* | (2024.01) | |
| *G06V 10/44* | (2022.01) | |
| *G06V 10/72* | (2022.01) | |
| *G06V 10/764* | (2022.01) | |
| *G06V 10/77* | (2022.01) | |
| *G06V 10/778* | (2022.01) | |
| *G06V 10/94* | (2022.01) | |
| *G06V 20/17* | (2022.01) | |
| *G06V 20/70* | (2022.01) | |
| *B64F 1/35* | (2024.01) | |
| *B64U 70/90* | (2023.01) | |
| *B64U 101/31* | (2023.01) | |
| *G05D 109/25* | (2024.01) | |

(52) U.S. Cl.
CPC ... *B64U 2101/31* (2023.01); *G05D 2109/254* (2024.01); *G06V 2201/10* (2022.01)

(56) References Cited

U.S. PATENT DOCUMENTS

| | | | |
|---|---|---|---|
| 10,284,875 | B2 | 5/2019 | Srinivasan et al. |
| 10,884,433 | B2 | 1/2021 | Tran et al. |
| 10,949,995 | B2 | 3/2021 | Gao |
| 11,104,438 | B2 | 8/2021 | Prager et al. |
| 11,227,405 | B2 | 1/2022 | Khatoonabadi et al. |
| 11,604,479 | B2 * | 3/2023 | Wu ..................... G05D 1/0676 |
| 11,745,899 | B2 | 9/2023 | Jourdan et al. |
| 2015/0227798 | A1 | 8/2015 | Nagano |
| 2016/0257424 | A1 | 9/2016 | Stabler et al. |
| 2019/0220039 | A1 | 7/2019 | Wu et al. |
| 2020/0130864 | A1 * | 4/2020 | Brockers ................. B60L 53/12 |
| 2020/0301015 | A1 | 9/2020 | Siddiqui et al. |
| 2022/0119105 | A1 | 4/2022 | Schmalzried et al. |
| 2023/0054875 | A1 | 2/2023 | Jourdan et al. |
| 2024/0019589 | A1 | 1/2024 | Jenkins et al. |
| 2024/0192705 | A1 * | 6/2024 | Reddy ...................... G06T 7/73 |
| 2024/0411316 | A1 * | 12/2024 | Miao .......................... G06T 7/73 |
| 2025/0078314 | A1 * | 3/2025 | Tsai .......................... G06T 7/74 |

OTHER PUBLICATIONS

Hou H. et al.: "UAV Pose Estimation in GNSS-Denied Environment Assisted by Satellite Imagery Deep Learning Features", IEEE Access, vol. 9, current version Jan. 2021, pp. 6358-6367, XP011835778.

PCT International Search Report and Written Opinion mailed May 23, 2025, in corresponding International Application PCT/US2025/021641, 14 pages.

International Search Report and Written Opinion mailed Feb. 14, 2024, in corresponding International Application No. PCT/US2023/081663, 12 pages.

Zhao et al., "Estimating 6D Pose From Localizing Designated Surface Keypoints", arXiv:1812.01387v1 [cs.CV] Dec. 4, 2018, 9 pages.

Kaiwen Duan et al., "CenterNet: Keypoint Triplets for Object Detection", arXiv:1904.08189v3 (cs.CV] Apr. 19, 2019, 10 pages.

Tae Ha Park et al., Towards Robust Learning-Based Pose Estimation of Noncooperative Spacecraft, arXiv:1909.00392v1 [cs.CV] AAS 19-840, Sep. 1, 2019, 20 pages.

Bo Chen et al., "Satellite Pose Estimation with Deep Landmark Regression and Nonlinear Pose Refinement", Computer Vision Foundation, ICCV Workshop paper is the Open Access version, Oct. 2019, 9 pages.

OpenCV (Open Source Computer Vision Library) Wikipedia, The Free Encyclopedia, Jun. 2000, 4 pages, Retrieved from "https://en.wikipedia.org/w/index.php?title=OpenCV&oldid=1146576754".

Perspective-n-Point, Wikipedia, The Free Encyclopedia, Jul. 19, 2022, 5 pages, Retrieved from "https://en.wikipedia.org/w/index.php?title=Perspective-n-Point&oldid=1099235396".

Mate Kisantal et al., "Satellite Pose Estimation Challenge: Dataset, Competition Design and Results", IEEE Transactions on Aerospace and Electronic Systems, arXiv:1911.02050v2 [cs.CV] Apr. 24, 2020, 15 pages.

David Lowe, "Scale-invariant feature transform", Wikipedia, The Free Encyclopedia, Feb. 28, 2023, 18 pages Retrieved from "https://en.wikipedia.org/w/index.php?title=Scale-invariant_feature_transform&oldid=1142129405".

Ian M. Crosby, "Wing Launches the Automated Wing Delivery Network, with Autoloader for Curbside Pickup", DroneLife, Mar. 9, 2023, 2 pages, https://dronelife.com/2023/03/09/wing-launches-the-automated-wing-delivery-rietwork-with-autoloader-for-curbside-pickup-videos/.

The Autoloader & Curbside pickup I Wing drone delivery, U-Tube video: https://www.youtube.com/watch?v=rABWi8w4sZw, Mar. 9, 2023, 2 pages of pictures.

The Wing Drone Delivery Network. U-Tube video: https://www.youtube.com/watch?v=xEcspDhZJuM&t=5s, Mar. 9, 2023, 4 pages of pictures.

Arjun Karpur et al., "LFM-3D: Learnable Feature Matching Across Wide Baselines Using 3D Signals," Google Research, arXiv:2303.12779v3 [cs.CV] Jan. 30, 2024, 12 pages.

Stonestrom, David et al., "Visual Detection and Localization of Package Autoloaders by UAV," U.S. Appl. No. 18/211,919, filed Jun. 20, 2023, 45 pages.

* cited by examiner

UAV 105

NETWORK
208

REMOTE
SERVER 204

300

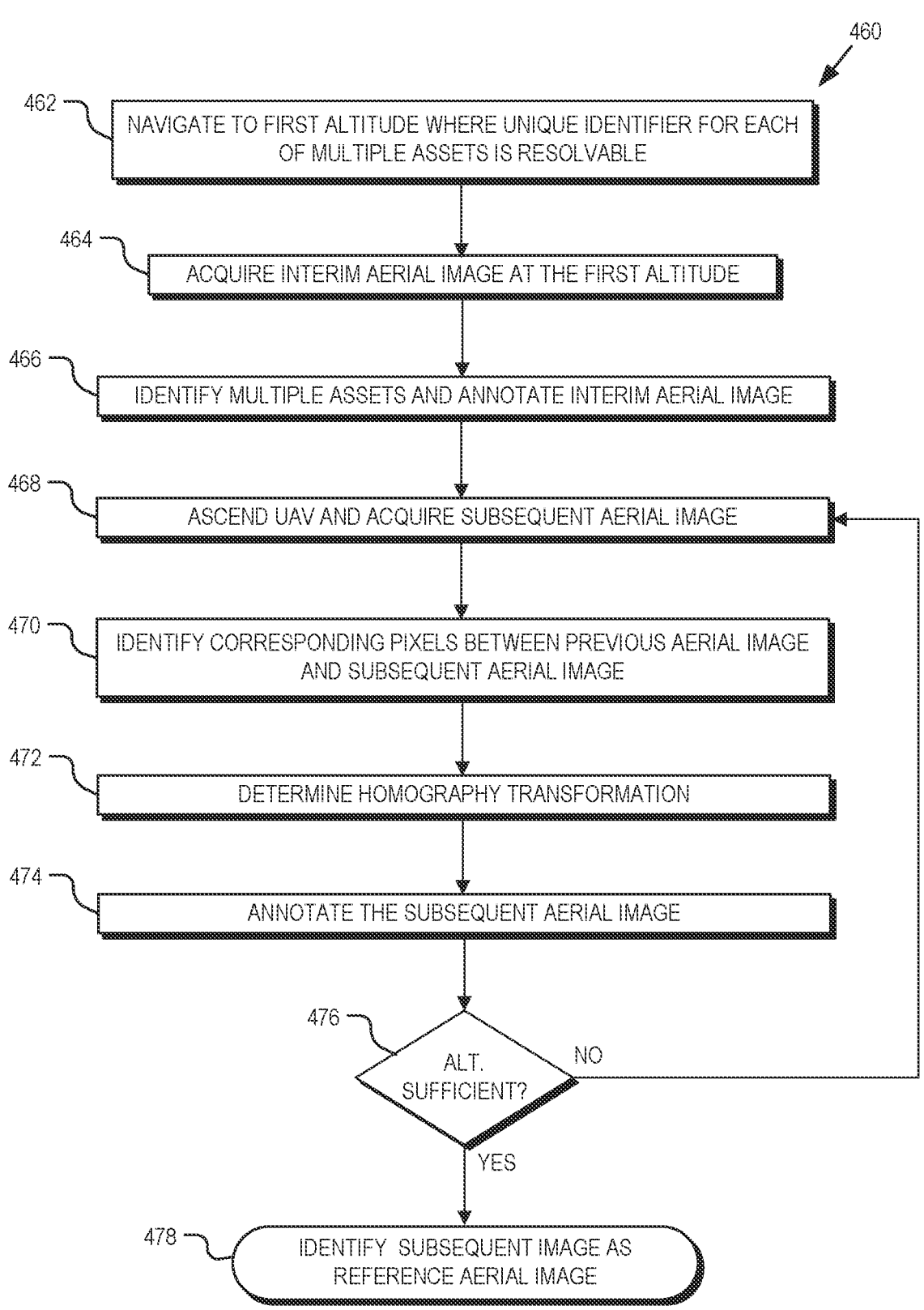

460

462 — NAVIGATE TO FIRST ALTITUDE WHERE UNIQUE IDENTIFIER FOR EACH OF MULTIPLE ASSETS IS RESOLVABLE

464 — ACQUIRE INTERIM AERIAL IMAGE AT THE FIRST ALTITUDE

466 — IDENTIFY MULTIPLE ASSETS AND ANNOTATE INTERIM AERIAL IMAGE

468 — ASCEND UAV AND ACQUIRE SUBSEQUENT AERIAL IMAGE

470 — IDENTIFY CORRESPONDING PIXELS BETWEEN PREVIOUS AERIAL IMAGE AND SUBSEQUENT AERIAL IMAGE

472 — DETERMINE HOMOGRAPHY TRANSFORMATION

474 — ANNOTATE THE SUBSEQUENT AERIAL IMAGE

476 — ALT. SUFFICIENT?     NO

YES

478 — IDENTIFY SUBSEQUENT IMAGE AS REFERENCE AERIAL IMAGE

FIG. 4B

ASSET LOCALIZATION WITH UNMANNED AERIAL VEHICLE

TECHNICAL FIELD

This disclosure relates generally to machine vision detection and localization of assets by unmanned aerial vehicles.

BACKGROUND INFORMATION

An unmanned vehicle, which may also be referred to as an autonomous or semi-autonomous vehicle, is a vehicle capable of traveling without a physically present human operator. Various types of unmanned vehicles exist for various different environments. For instance, unmanned vehicles exist for operation in the air, on the ground, underwater, and in space. Unmanned vehicles also exist for hybrid operations in which multi-environment operation is possible. Unmanned vehicles may be provisioned to perform various different missions, including payload delivery, exploration, reconnaissance, imaging, public safety, surveillance, or otherwise. The mission definition will often dictate a type of specialized equipment and/or configuration of the unmanned vehicle.

Unmanned aerial vehicles (also referred to as drones) can be adapted for package delivery missions to provide an aerial delivery service. One type of unmanned aerial vehicle (UAV) is a vertical takeoff and landing (VTOL) UAV. VTOL UAVs are particularly well-suited for package delivery missions. The VTOL capability enables a UAV to takeoff and land within a small footprint thereby providing package pick-ups and deliveries almost anywhere. The ability to pick up and drop off packages safely, efficiently, in a variety of space constrained environments, all in a low human touch manner, are beneficial attributes that will encourage marketplace adoption of UAV aerial deliveries.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

FIG. 4B is a flow chart illustrating a method of operating a UAV to generate a reference aerial image for automated detection and localization of multiple instances of an asset, in accordance with an embodiment of the disclosure.

DETAILED DESCRIPTION

Figure 1A:
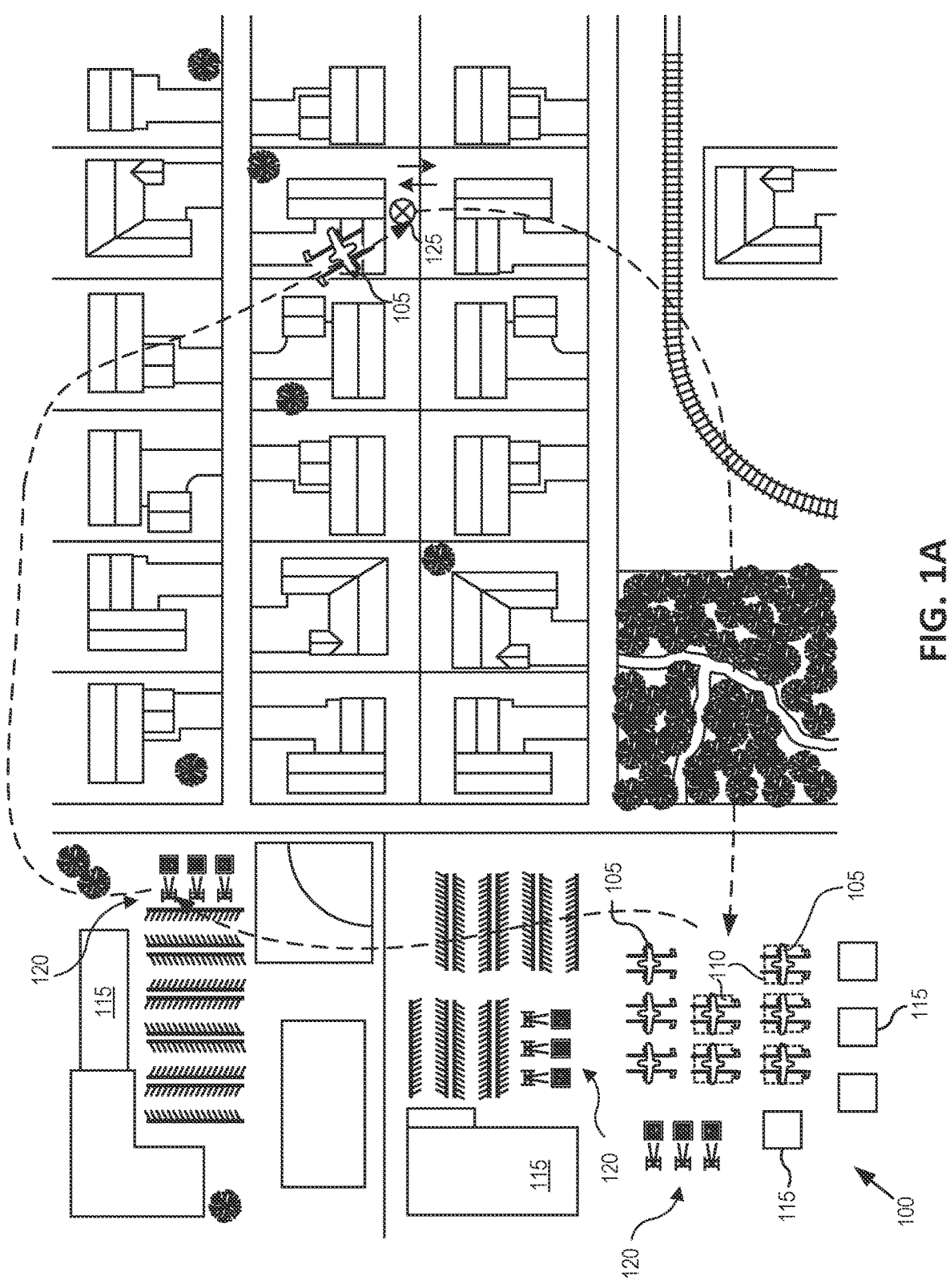
FIG. 1A illustrates operation of unmanned aerial vehicles (UAVs) that retrieve packages from autoloaders to provide an aerial delivery service to a neighborhood, in accordance with an embodiment of the disclosure.

Embodiments of a system, apparatus, and method of operation of an unmanned aerial vehicle (UAV) capable of asset detection and localization are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIG. 1 is a plan view illustration including a terminal area 100 for staging UAVs 105 that deliver packages into a neighborhood, in accordance with an embodiment of the disclosure. UAVs may one day routinely deliver small items into urban or suburban neighborhoods from small regional or neighborhood hubs such as terminal area 100 (also referred to as a local nest). Vendor facilities 115 that wish to take advantage of the aerial delivery service may be set up immediately adjacent to terminal area 100 or be dispersed throughout the neighborhood. Attendants at the various vendor facilities 115 may load packages to be delivered by UAVs 105 onto autoloaders 120 in anticipation of a pickup and delivery to a customer in the surrounding neighborhood. An example aerial delivery mission may include a UAV 105 taking off from terminal area 100, rising to a cruise altitude and flying to a particular instance of autoloaders 120 (i.e., a designated autoloader) where a package has been staged. As UAV 105 approaches the designated autoloader, it enters a pickup segment of its flight mission, where it descends and navigates into alignment with the designated autoloader to load the package onto UAV 105. After the package has been loaded, UAV 105 ascends back to its cruise altitude enroute to a customer destination 125. At destination 125, UAV 105 descends for package drop-off before once again ascending to a cruise altitude for the return journey back to terminal area 100. While at terminal area 100, UAVs 105 may land upon charging pads 110 which can be used to inductively charge a UAV that has been positioned thereon.

Charging pads 110 and autoloaders 120 are included in assets associated with UAVs 105. Specifically, a given UAV 105 may be instructed to perform an action associated with a specific asset included in multiple instances of the asset. The action may be any operation performed by the given UAV that results in the given UAV interacting with or otherwise navigating to the specific asset. Example operations include battery charging, package pick-up, UAV navigation, and the like. Accordingly, an asset facilitates operation of UAVs 105 and corresponds to any object UAVs 105 interact with (e.g., physically come into contact with or otherwise navigate to). Example assets include, but are not limited to, charging pads 110 and autoloaders 120.

In order to perform the action, the given UAV must disambiguate between multiple instances of the asset, which may appear visually identical from an aerial perspective of the given UAV. In some embodiments, assets include visual fiducial markers (see, e.g., FIG. 1B) to uniquely identify individual assets included in the multiple instances of the asset. However, visual identifiers may not be resolvable by an onboard camera of UAVs 105 when operating at typical altitudes. For example, at cruising altitude UAVs 105 may not be able to visually distinguish between autoloaders 120 regardless of whether autoloaders 120 include fiducial markers or not. Additionally or alternatively, the assets may have additional data accessible by UAVs 105 (e.g., stored on local memory of UAVs 105 and/or received by UAVs 105 from a remote server or backend management system coupled to UAVs 105), such as a precise global navigation satellite system (GNSS) position for each of the multiple instances of the asset, a reference aerial image of the multiple instances of the asset annotated to uniquely identify the multiple instances of the asset, or other data indicative of the location and identification of the multiple instances of the asset.

Asset disambiguation is important for efficient and accurate operation of UAVs 105 (e.g., to ensure the package loaded on a specific instance of autoloaders 120 is picked up by the correct UAV included in UAVs 105). Embodiments disclosed herein describe a system, apparatus, and method of operation of a UAV for disambiguation of multiple instances of an asset included in a query aerial image using image features to map the reference aerial image to the query aerial image. Finding which pixels or image areas in the reference aerial image map to the query aerial image facilitates asset disambiguation which is useful because it allows UAVs 105 to then use visual servoing (e.g., relative navigation) to get the UAV to the correct asset even in the presence of GNSS error both for both the UAV position estimate and asset location estimate. Detecting fiducial markers placed at the base of each asset to disambiguate between the multiple instances of the asset suffer range and reliability issues. Furthermore, fiducial markers take up valuable real estate. Being able to disambiguate between multiple instances of the asset at useful above ground level (AGL) values the UAVs 105 operate therein without necessarily depending on fiducial markers or an accurate absolute position estimate of UAVs 105 and/or the assets will improve the reliability with which UAVs 105 can safely and successfully perform the action (e.g., pick up the package from the correct autoloader included in the autoloaders 120).

Figure 1B:
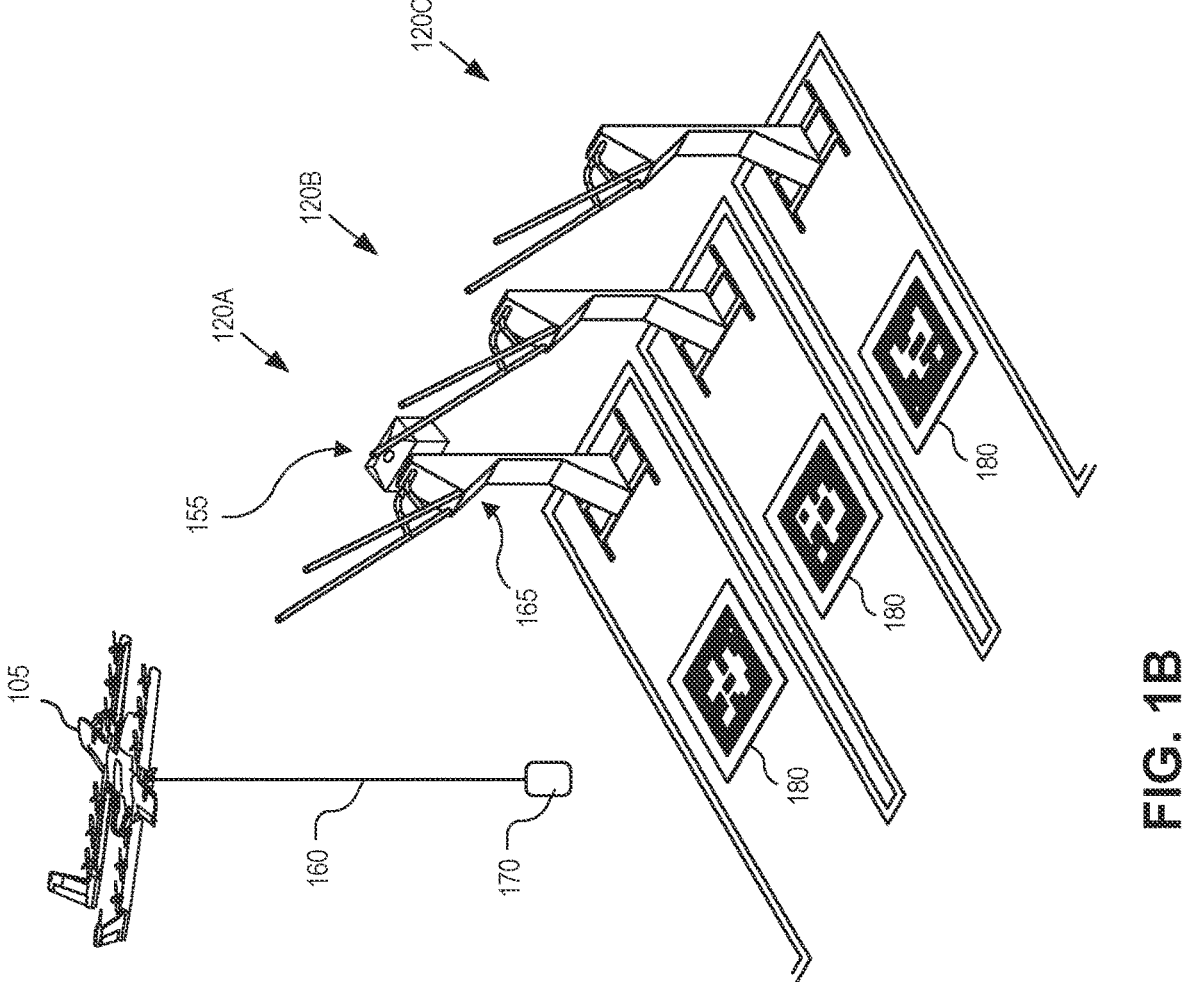
FIG. 1B is a perspective view illustration of a UAV navigating into alignment with an autoloader for package retrieval after detecting, localizing, and/or identifying using image features, in accordance with an embodiment of the disclosure.

FIG. 1B is a perspective view illustration of UAV 105 navigating into alignment with an autoloader 120A for package retrieval after detecting, localizing, and/or identifying the multiple instances of autoloaders 120 (e.g., 120A,

120B, and 120C) using image features, in accordance with an embodiment of the disclosure. The perspective view illustration shows a demonstrative bank of three autoloaders 120A-C (collectively included in autoloaders 120). Autoloaders 120 represent an example of multiple instances of an asset associated with UAVs 105. However, it should be appreciated that the techniques described herein are not limited to the specific autoloader apparatus illustrated, but rather are broadly applicable to any apparatus used for pickup of packages by UAVs 105 as well as other assets associated with the UAVs 105 (e.g., charging pads 110 illustrated in FIG. 1A). Autoloaders 120 are apparatuses adapted to load packages onto lines deployed from UAVs 105. Autoloaders 120 provide a low touch autoloading function by disconnecting the act of staging a package that is ready for pickup from the act of pickup itself by UAVs 105. As illustrated in FIG. 1B, autoloader 120A has been loaded with a package 155 that is ready for delivery. The autoloading apparatus includes booms that guide a line 160 deployed from UAV 105 into a receiver base 165 where package 155 is staged and waiting for pickup. Line 160 may include an end attachment 170 that is guided into alignment with and attached to package 155 by receiver base 165. Once attached, UAV 105 can recoil line 160 with package 155 attached thereto before transitioning to a cruise segment of the package delivery mission.

Figure 2:
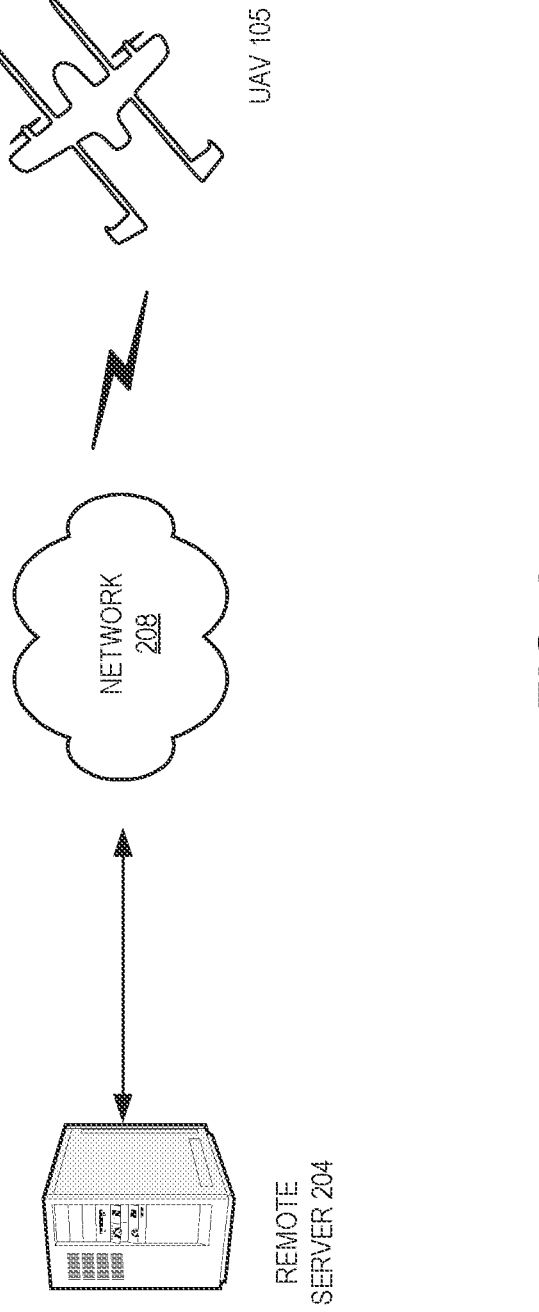
FIG. 2 illustrates a UAV communicatively coupled to a remote server to receive and/or transmit reference aerial images annotated to indicate a location and identification of multiple instances of an asset, in accordance with an embodiment of the disclosure.

There are at least three technical tasks that need to be accomplished in the field of machine vision perception to visually navigate UAV 105 into alignment with autoloader 120A to pick up package 155 in an automated manner without a human attendant present to facilitate transfer of package 155 onto line 160. These tasks include aerial detection of autoloaders 120, localization of autoloaders 120 relative to UAV 105, and identification of the specific autoloader 120A pre-staged with the correct package 155 (when a group of autoloaders are present as illustrated in FIG. 2). All three of these tasks may be accomplished using visual fiducial markers 180 (e.g., two-dimensional matrix barcodes), such as AprilTags. A unique visual fiducial marker 180 may be placed on the ground adjacent to a corresponding autoloader 120 with a fixed offset and orientation relative to the given autoloader 120. The machine vision system onboard UAV 105 can then detect, localize, and identify the corresponding autoloaders 120 by detecting, localizing, and identifying visual fiducial markers 180 and assuming the fixed offset and orientation of the corresponding autoloader 180.

The use of visual fiducial markers 180 for detection, localization, and identification can have a number of drawbacks. First, the visual fiducial markers 180 become a single point of failure that is susceptible to fading, wearing out, damage, visual obstructions due to dirt and debris, shadows, etc. In order for the visual fiducial markers 180 to be effective at useful altitudes, they are often relatively large and thus not aesthetically pleasing and take up valuable real estate. However, as discussed previously, even the large size of visual fiducial markers 180 may be insufficient to be resolvable by UAVs 120 (e.g., at cruising altitude). Furthermore, their large size presents additional shipping logistics when deploying a new autoloader and must be correctly installed (position and orientation) relative to the associated autoloader 120. This makes the visual fiducial marker paradigm susceptible to human error during installation.

Embodiments described herein may be used as a redundant or backup technique for detection and localization of multiple instances of assets such as autoloaders 120 in the event of failure of visual fiducial markers 180, charging pads 110, landing pads, or other assets. Alternatively, the machine vision perception techniques described herein may be deployed as the primary, or sole, technique for detection and localization of multiple instances of assets by UAVs 105. The techniques described may use the same onboard camera and machine vision systems as used to detect visual fiducial markers 180, but with functionality programmed to find corresponding pixels between an annotated reference aerial image including multiple instances of an asset to an unannotated query aerial image including the multiple instances of the asset. In particular, the techniques described may detect, extract, and match image features between the reference aerial image and the query aerial image. The matched image features may subsequently be utilized to find a homography transformation (e.g., a three-by-three matrix) that describes a relationship between corresponding pixels between the query aerial image and the reference aerial image. In the same or other embodiments, the homography transformation enables mapping the annotated pixels of the reference aerial image to the query aerial image to annotate the query aerial image to localize the multiple instances of the asset.

In some embodiments, the image features correspond to machine-learned image features that include environmental context of the reference aerial image and the query aerial image that extend beyond local information associated with individual pixels. Advantageously, the detection and localization techniques described herein are not reliant upon large, unsightly visual fiducial markers nor even require the presence of the multiple instances of the asset within the reference aerial image so long as the reference aerial image is annotated to indicate an expected location and identification of the assets. The techniques described herein may utilize machine-learned image features in combination with annotations from a reference aerial image for asset detection and localization and thus are less susceptible to human installation error. Advantageously, image features (machine-learned or otherwise) used herein may be scale invariant, perspective invariant, and/or lighting invariant to enable robust automated detection and localization of assets by UAVs 105.

FIG. 2 illustrates a UAV 105 communicatively coupled to a remote server 204 over network 208 (e.g., cellular LTE network) to receive and/or transmit reference aerial images annotated to indicate a location and identification of multiple instances of an asset, in accordance with an embodiment of the disclosure. In some embodiments, the reference aerial image corresponds to a two-dimensional aerial image of an area including multiple instances of an asset. The reference aerial image has been annotated to disambiguate between the multiple instances of the asset. In some embodiments, the reference aerial image includes metadata corresponding to the annotations and identifies or flags specific pixels of the reference aerial image as being associated with individual assets included in the multiple instances of the asset. For example, each of the multiple instances of the assets may have a corresponding unique identification number or name that may be included in the annotations. Thus, if the multiple instances of the asset include a first asset with a first identification, a second asset with a second identification, and a third asset with a third identification, the annotations included in the reference aerial image may indicate which pixels (e.g., one or more) of the reference aerial image respectively correspond to the first asset, the second asset, and the third asset. In some embodiments, the metadata or annotations define a two-dimension area (e.g., in the form of bounding boxes) of the reference aerial image for each instance included in the multiple instances of the asset.

In some embodiments, the remote server 204 includes a plurality of reference aerial images. Before or during a mission, UAV 105 may request the reference aerial image of a given area UAV 105 is or will be operating within or is otherwise associated with a mission given UAV 105. For example, in preparation for a delivery mission, UAV 105 may be provisioned by remote server 204 (e.g., a backend management system) with mission instructions that include which asset UAV 105 is to interact with (e.g., to pick up a package or inductively charge) and further include an annotated reference aerial image of the given area. In another embodiment, UAV 105 may provide an approximate location (e.g., GNSS coordinates, etc.) to the remote server 204 and the remote server 204 may respond by transmitting an annotated reference image that is within a threshold distance from the approximate location of UAV 105. In the same or other embodiments, remote server 204 UAV 105 may provide an approximate time (e.g., current time or the time UAV 105 is expected to interact with asset or otherwise be over the area with the multiple instances of the asset) and the remote server 204 may select a reference image to transmit to UAV 105 that is closer to the time UAV is 105 expected to interact with the asset. In the same or another embodiment, weather conditions may be taken into account and UAV 105 may provide, or remote server 204 may determine, approximate cloud coverage and a reference aerial image with closer weather conditions may be selected by remote server 204 to be transmitted to UAV 105 (e.g., a reference aerial image with comparable cloud coverage to the query aerial image may be selected). In other embodiments, remote server 204 may select a reference aerial image based on multiple factors (e.g., location, time of day, weather, and the like). However, in other embodiments, a reference aerial image may not be available for the given area and thus UAV 105 may generate an annotated reference aerial image as part of its mission instructions (see, e.g., FIG. 4B). The annotated reference aerial image may then be sent to the remote server 204 for use in future missions. In other embodiments, UAV 105 may capture a plurality of aerial images which is transmitted to remote server 204 along with state information from onboard sensors of UAV 105 (e.g., inertial measurement unit, accelerometer, gyroscope, compass, GPSS data, altimeter, etc.) for each of the captured aerial images. Remote server 204 may then generate a reference aerial image based on the received aerial images and state information.

Figure 3:
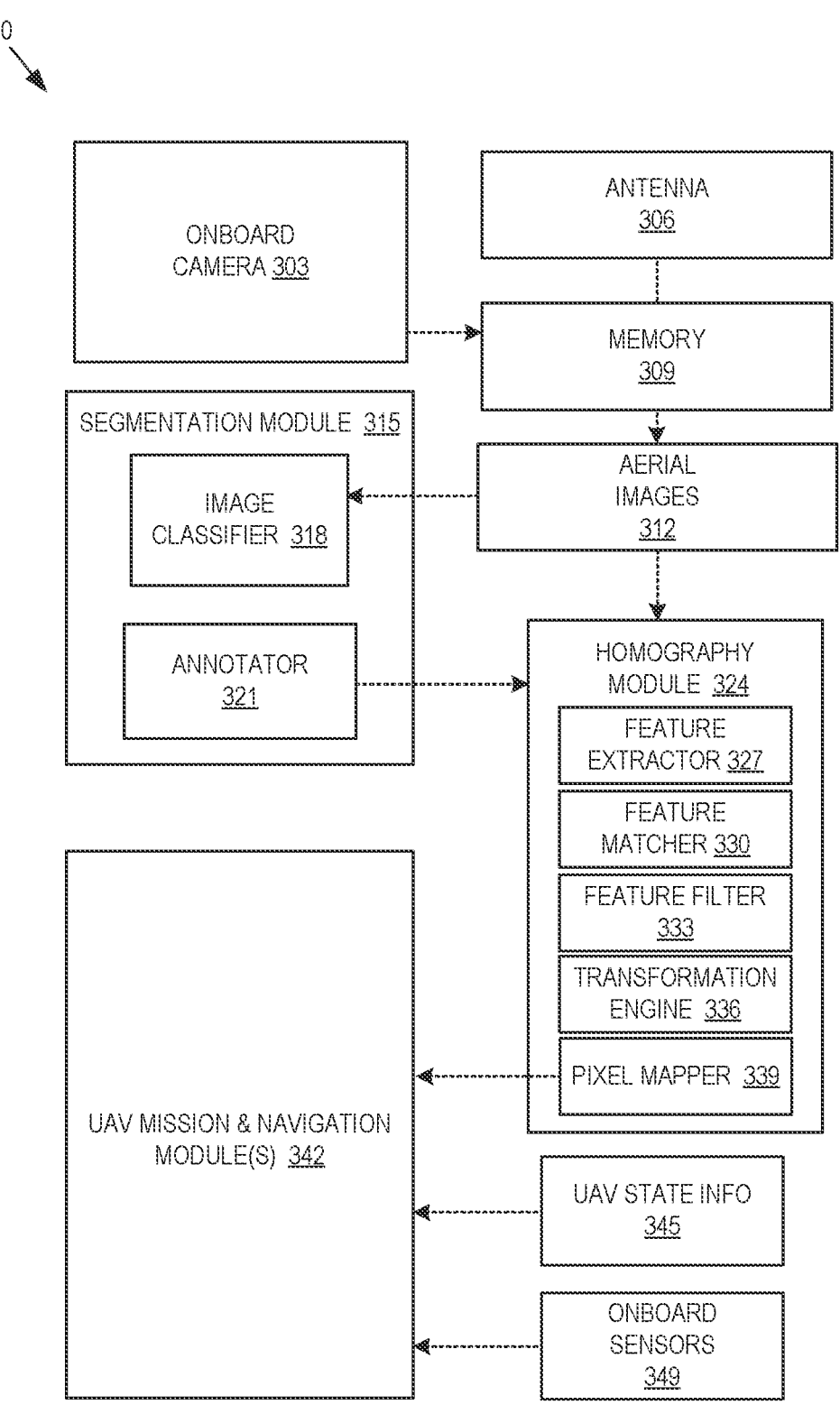
FIG. 3 is a system software architecture for implementing asset detection, localization, and identification with image features, in accordance with an embodiment of the disclosure.

FIG. 3 is a system software architecture 300 for implementing asset detection, localization, and identification with image features by UAVs 105, in accordance with an embodiment of the disclosure. The illustrated embodiment of architecture 300 includes a segmentation module 315, a homography module 324, and UAV mission and navigation modules 342. The illustrated embodiment of the segmentation module 315 includes an image classifier 318 and an annotator 321. The illustrated embodiment of the homography module 324 includes a feature extractor 327, a feature matcher 330, a feature filter 333, a transformation engine 336, and a pixel mapper 339. FIG. 3 illustrates a processing pipeline for implementing a machine vision perception capable of automated asset detection and localization.

The UAVs 105 include an onboard camera 303, an antenna 306, and memory 309. The UAVs 105 are configured to generate (e.g., via onboard camera 303) and receive (e.g., from remote server 204 via antenna 306) aerial images 312, which may be stored in memory 309 (e.g., a non-transitory machine readable storage medium). The aerial images 312 include annotated and unannotated images of a given area that include multiple instances of an asset. For example, aerial images 312 may be images of an area (e.g., ground area) below UAV 105 and include a reference aerial image (i.e., annotated) and a query aerial image (e.g., unannotated). Reference aerial images may correspond to annotated images of an area (e.g., ground area) below UAV 105, which may include multiple instances of an asset (e.g., charging pads 110, autoloaders 120, or other assets) and associated annotations (e.g., bounding boxes or other pixel-level metadata). It is appreciated that the reference aerial image and the ground aerial image may have different perspectives (e.g., based on UAV position, orientation, altitude, etc.) and represent the area at different times. For example, the query aerial image represents a view of UAV 105 positioned over the area while the reference aerial image may represent a different view of the area captured by a different UAV at a different time. In some embodiments, one or more of the multiple instances of the asset are not physically present in the reference aerial image but annotations of the reference aerial image provide an expected location and identity of the multiple instances of the asset within the area. In some embodiments, architecture 300 is utilized to annotate the query aerial image. In the same or other embodiments, a reference aerial image is not available and architecture 300 may be utilized to generate a reference aerial image for future missions.

Segmentation module 315 is coupled to onboard camera 303 of UAV 105 to receive and process aerial images 312. More specifically, segmentation module 315 may receive aerial images 312 that have not been annotated, but represent an image of an area where unique identifiers (e.g., fiducial markers 180) of the multiple instances of the asset are resolvable (i.e., readable) by UAV 105. In one embodiment, image classifier 318 is a machine learning neural network trained to identify multiple instances of an asset, such as charging pads 110 and autoloaders 120. In some embodiments, image classifier 318 may be trained to perform its detections using a dataset of aerial images that have been annotated with ground truth data by humans that label the multiple instances of the asset in the aerial images. Furthermore, the training data may also include bounding boxes drawn around the multiple instances of the assets to train the neural network to identify the whole object. In other words, each bounding box encircles an individual asset included in the multiple instances of the asset. Of course, other training techniques may also be used. For example, the neural network may also be trained on simulated/synthetic data where the ground truth data for the multiple instances of the asset are known. In one embodiment, image classifier 318 performs semantic segmentation on aerial images 312 to detect multiple instances of the asset within a given aerial image 312. After the multiple instances of the asset have been identified, annotator 321 may annotate the given aerial image 312 to associate specific pixels with corresponding unique visual identifiers associated with the asset. For example, image classifier 318 may generate bounding boxes for the multiple instances of the assets and specific bounding boxes may be associated with enclosed unique visual identifiers by the annotator 321 to annotate the given aerial image 312. The annotated aerial image 312 may then be passed on to homography module 324 to be used as a reference image or interim aerial image, in accordance with embodiments of the disclosure.

Homography module 324 is coupled to receive an annotated aerial image (e.g., a reference aerial image or an interim aerial image) and an unannotated aerial image (i.e., a query aerial image). Feature extractor 327 includes a deep neural network configured to extract image features (e.g., feature descriptors describing salient points of interest) from the reference aerial image and the query aerial image and generating n-dimensional feature vectors associated with individual pixels or groups of pixels of the reference aerial image and the query aerial image. The feature vectors correspond to the feature descriptors encoded within a multidimensional feature space. It is appreciated that the image features may include intuitive image features (e.g., corners, edges, angles, contours, colors, gradients, intensities, and the like) and non-intuitive image features (e.g., machine-learned image features). More generally, an image feature corresponds to a piece of information describing the contents of a given image that is associated with a particular pixel of the given image. In some embodiments, the image features include local image features that capture a descriptor for a given pixel using the image information present in a region of the given image that surrounds that pixel. That region of information can be arbitrarily large and could, in some cases, contain the entire image. Importantly, the image features or descriptors utilized in techniques described herein are associated with a particular image pixel (e.g., such that corresponding pixels between images may be determined).

Advantageously, machine-learned image features utilized in embodiments described herein are not specifically looking at the multiple instances of the asset. Rather, environmental context across the entire image is utilized to identify features. In other words, embodiments described herein are asset agnostic. Structural details about the asset are not necessary to generate an annotated query image. Indeed, when UAV 105 captures an image at typical operating altitude (e.g., cruise altitude), the multiple instances of the asset represent but a fraction of the content within the query image. Instead, image features are extracted throughout the query and reference aerial images. The machine learning model may be trained to recognize features using aerial images of an area taken at different times of day, different altitudes, and different UAV orientations (i.e., perspectives) to configure the feature extractor 327 to be invariant (e.g., within a threshold difference) to changes in lighting, perspective, scale, altitude, and the like.

Once image features have been extracted from the reference and query aerial images and feature vectors encoded, feature matcher 330 compares image features found in the reference aerial image to image features found in the query aerial image. More specifically, each feature vector may be associated with a given pixel (i.e., a keypoint pixel) such that the reference aerial image and the query aerial image each have a plurality of corresponding feature vectors and keypoint pixels. The feature vectors may be subsequently compared within the multidimensional feature space and a distance between feature vectors within the feature space determined. In some embodiments, feature vectors may be considered to be a match when the distance between the feature vectors within the feature space is below a threshold value. It is appreciated that matched feature vectors or feature descriptors are associated with respectively matched pixels between the reference and query aerial images.

The matched feature vectors and/or corresponding matched image pixels are subsequently passed to the feature filter 333 which is configured to distinguish between true correspondences and false correspondences. In other words, the matched features may include outliers that are not true correspondences between the reference and query aerial images. In some embodiments, the feature filter 333 uses an algorithm (e.g., random sample consensus) to determine inliers and outliers respectively corresponding to true correspondences and false correspondences for the matched features and/or matched image pixels. In some embodiments, the feature filter 333 filters or removes outliers included in the matched machine-learned images.

Transformation engine 336 subsequently utilizes the matched features that have had outliers removed to generate a homography transformation that describes a relationship between the query aerial image and the reference aerial image. In some embodiments, the homography transformation corresponds to a three-by-three matrix capable of a perspective transformation between the reference aerial image and the query aerial image. More specifically, once a sufficient number (e.g., four or more) of matched features are determined, a homography transformation capable of correlating each pixel included in the reference aerial image to a corresponding pixel included in the query aerial image may be determined.

Pixel mapper 339 subsequently utilizes the homography transformation to annotate the query aerial image by mapping the annotated pixels of the reference aerial image to the query aerial image. In doing so, each corresponding pixel in the query aerial image is found for each annotated pixel included in the reference aerial image thereby propagating the annotations of the reference aerial image to the query aerial image. Once the annotations of the reference aerial image are passed to the query aerial image, each asset included in the query aerial image may be identified or known regardless of whether the unique identifier is actually resolvable from the query aerial image. In other words, the annotations passed to the query aerial image allows for distinguishing between individual assets included in the multiple instances of the asset.

UAV mission and navigation modules 342 subsequently direct the UAV to perform an action associated with a specific asset that has been identified in the multiple instances of the asset. For example, UAV mission and navigation modules 342 may use the location of the specific asset included in the query aerial image (e.g., 2D pixel coordinates) in combination with UAV state information 345 and onboard sensors 349 to generate translation vectors that estimate a relative position of the specific asset with respect to UAV 105. In one embodiment, the translation vectors convert the 2D pixel coordinates into a fixed earth frame to simplify tracking and navigation. In some embodiments, the action includes navigating UAV 105 into alignment with an identified autoloader 120 or landing UAV 105 on an identified charging pad 110. UAV mission and navigation modules 320 may include various avionics and mission control software.

Figure 4A:
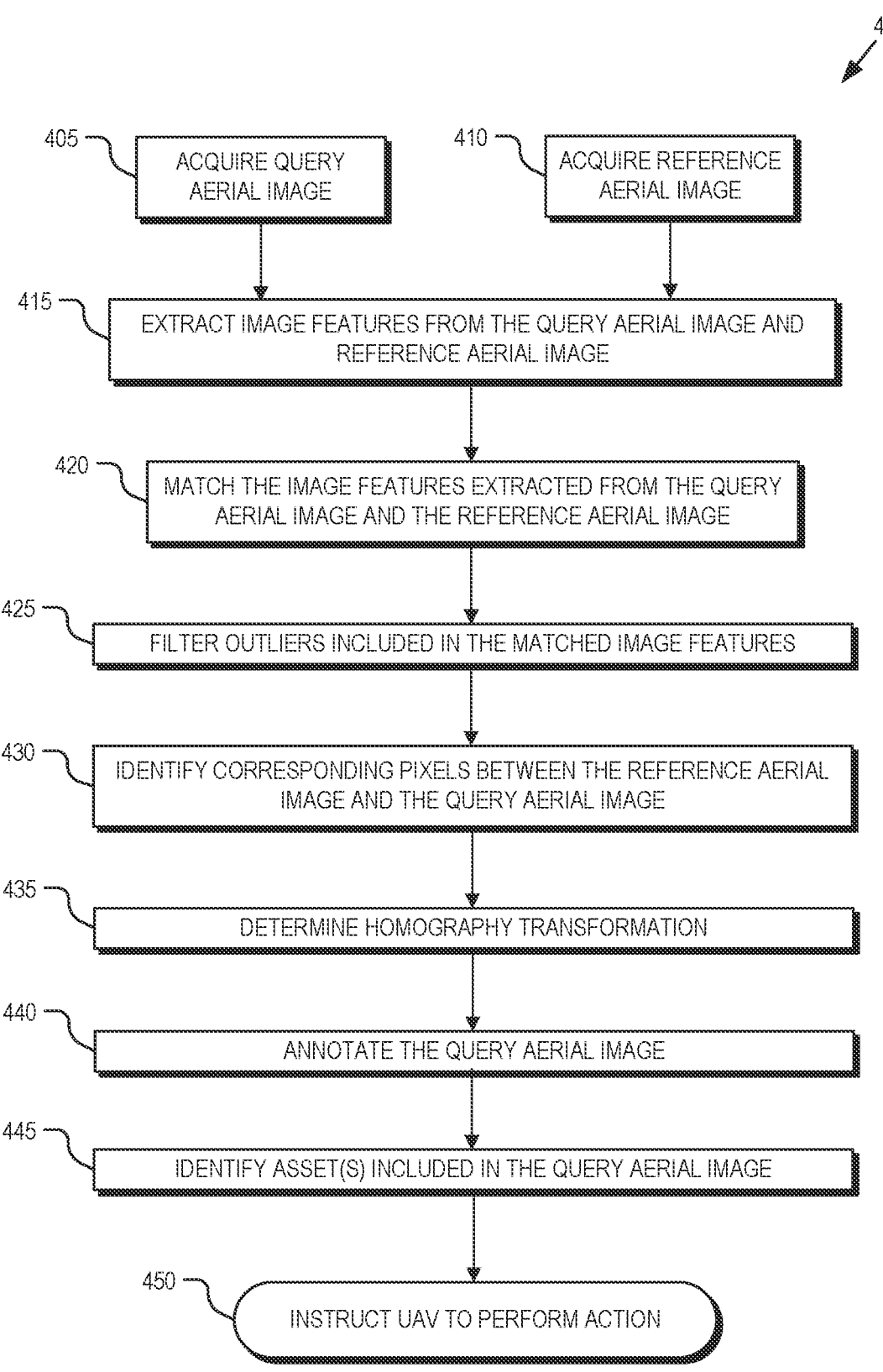
FIG. 4A is a flow chart illustrating a method of operating a UAV for automated detection and localization of multiple instances of an asset when a reference aerial image is available, in accordance with an embodiment of the disclosure.

FIG. 4A is a flow chart illustrating a process 400 of operating a UAV 105 for implementing asset detection, localization, and identification with image features, in accordance with an embodiment of the disclosure. The order in which some or all of the process blocks appear in process 400, which includes blocks 410-450, should not be deemed limiting. Rather, one of ordinary skill in the art having the benefit of the present disclosure will understand that some of the process blocks may be executed in a variety of orders not illustrated, or even in parallel. Although process 400 is described in connection with picking up packages from autoloaders 120, it should be appreciated that process 400 may be generally applicable for navigating UAVs 105 into alignment with a variety of ground-based objects for a variety of purposes (e.g., other assets such as charging pads

110). Similarly, autoloaders 120 may assume a variety of different form factors than illustrated in FIG. 1B.

In a process block 405, UAV 105 is executing an aerial delivery mission and enters a pickup segment of the mission upon reaching the vicinity of autoloaders 120. In one embodiment, the pickup segment is entered based upon global positioning system (GPS) coordinates. Upon entering the pickup segment, UAV 105 acquires a query aerial of the area below UAV 105, which includes multiple instances of an asset (e.g., charging pads 110, autoloaders 120, or other assets). The query aerial image is acquired with onboard camera 303, which may be positioned on the underside of UAV 105 to capture downward facing aerial images. The query image includes multiple instances of an asset. In some embodiments, the asset corresponds to an autoloading apparatus that is adapted to load a package onto a line deployed from the UAV or a charging pad adapted to charge a battery of the UAV.

Figure 5:
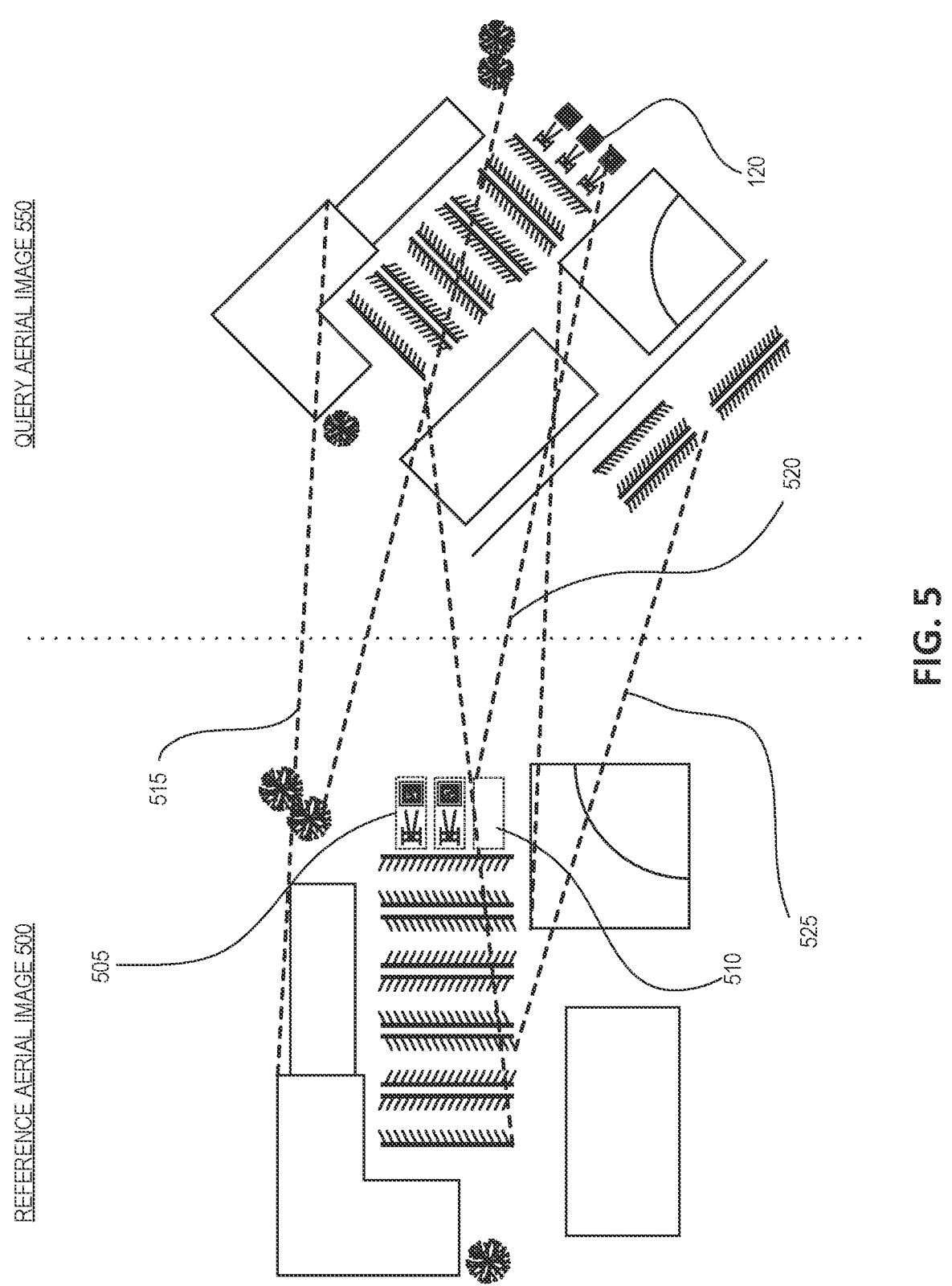
FIG. 5 illustrates a plurality of corresponding pixels between a reference aerial image and a query aerial image, in accordance with an embodiment of the disclosure.

In process block 410, UAV 105 acquires a reference aerial image of the same area as the query aerial image. It is appreciated that the reference aerial image and the query aerial image may have different perspectives (e.g., based on UAV position, orientation, altitude, etc.) and represent the area at different times. In some embodiments, a first perspective of the reference aerial image is different from a second perspective of the query aerial image. The reference aerial image may be obtained from remote server 204 and/or stored in memory 309 of UAV 105. In some embodiments, the reference aerial image is not a full resolution image. Rather, the reference aerial image may correspond to or otherwise include annotations (e.g., pixel coordinates or locations annotated to indicate an expected asset location within the reference aerial image as well as a unique identification of the asset), extracted image features, and the corresponding pixel coordinates associated with the extracted image features. In such an embodiment, the amount of information remote server 204 transmits to UAV 105 may be reduced, the rate at which UAV 105 receives the reference aerial image from remote server 204 may be increased (e.g., total transfer duration from remote server 204 to UAV 105 is reduced since less data is transferred), and the amount of memory needed to store the reference aerial image may be less relative to a full resolution image. Another advantageous of pre-storing image features and annotations of the reference aerial image is that computational burden on UAV 105 may be reduced as image features do not need to be extracted from the reference aerial image when the reference aerial image itself corresponds to image features. It is appreciated that both the reference and query aerial images are collectively referred to as aerial images 312. The reference aerial image includes annotated pixels indicating an expected image location and an identification for the multiple instances of the asset. In some embodiments, the reference aerial image does not include the multiple instances of the asset. FIG. 5 illustrates an example reference aerial image 500 and query aerial image 550 that include multiple instances of an asset or annotations thereof. Accordingly, reference aerial image 500 and query aerial image 550 represent examples of aerial images 312.

In a process block 415, image features are extracted from the query aerial image and the reference aerial image using feature extractor 327. In some embodiments, image features include machine-learned image features that include environmental context of the reference aerial image and the query aerial image that extend beyond local information associated with the individual pixels. In other words, context of the entire reference and query images are utilized to generate image features rather than solely looking at the multiple instances of the asset.

In a process block 420, image features extracted from the query aerial image and the reference aerial image are matched using feature matcher 330 to identify a plurality of corresponding pixels between the query aerial image and the reference aerial image. Specifically, image features of the query aerial image are matched to image features of the reference aerial image. In one embodiment, image features are matched based on a distance between feature vectors within a multidimensional feature space. It is appreciated that each matched feature is associated with corresponding pixels in the reference and query aerial images.

In a process block 425, the matched image features or corresponding pixels are filtered to remove outliers using the feature filter 333, which is configured to distinguish between true correspondences and false correspondences. In other words, the matched features may include outliers that are not true correspondences between the reference and query aerial images. In some embodiments, the feature filter 333 uses an algorithm (e.g., random sample consensus) to determine inliers and outliers respectively corresponding to true correspondences and false correspondences for the matched features and/or matched image pixels. In some embodiments, the feature filter 333 filters removes outliers included in the matched machine-learned images.

In a process block 430, corresponding pixels between the reference aerial image and the query aerial image are determined based on the matched image features after filtering outliers. The corresponding pixels may include paired pixel coordinates or location of the reference aerial image and the query aerial image. For example, a pixel at location (x1, y1) of the reference aerial image may have a corresponding location at (x2, y2) of the query aerial image which corresponds to a first corresponding pair of pixels included in a plurality of corresponding pixels.

In a process block 435, a homography transformation describing a relationship between the query aerial image and the reference aerial image is determined using the plurality of corresponding pixels via transformation engine 336. It is appreciated that in some embodiments, the homography transformation is determined using the matched machine-learned image features after filtering the outliers. More specifically, the paired pixel coordinates are utilized to generate a transformation matrix capable of converting between pixel locations of the reference aerial image and the query aerial image. For example, a first pixel coordinate of the reference aerial image input into the transformation matrix results in an output of a second pixel coordinate of the query aerial image that represent the same location.

In a process block 440, the query image is annotated by mapping the annotated pixels of the reference aerial image to the query aerial image using the homography transformation via pixel mapper 339. In some embodiments, the annotated pixels of the reference aerial image include bounding boxes enclosing individual instances (e.g., an individual one of autoloaders 120) of the multiple instances of the asset. In such an embodiment, when each annotated pixel of the reference aerial image is mapped to the query aerial image, a plurality of bounding boxes, each encircling an individual asset included in the multiple instances of the asset within the query aerial image are generated. The plurality of bounding boxes is configured to distinguish between the multiple instances of the asset based on the unique identifier for each of the multiple instances of the asset and the mapped annotated pixels of the reference aerial image.

In a process block 445, the annotations propagated to the query aerial image from the reference aerial image are utilized to identify each instance of the assets included in the query aerial image. Subsequently, a location of a first instance of the asset included in the multiple instances of the asset within the query aerial image may be determined.

In a process block 450, UAV 105 is instructed to perform an action associated with the first instance of the asset. In some embodiments, the action associated with the first instance of the asset includes navigating the UAV into alignment with the first instance when the asset corresponds to the autoloading apparatus or landing the UAV onto the first instance when the asset corresponds to the charging pad.

FIG. 4B is a flow chart illustrating a process 460 of operating a UAV 105 to generate a reference aerial image for automated detection and localization of multiple instances of an asset, in accordance with an embodiment of the disclosure. The order in which some or all of the process blocks appear in process 460, which includes blocks 462-478, should not be deemed limiting. Rather, one of ordinary skill in the art having the benefit of the present disclosure will understand that some of the process blocks may be executed in a variety of orders not illustrated, or even in parallel.

In a process block 462, UAV 105 is instructed to navigate to an area including multiple instances of an asset where a reference aerial image is unavailable or an updated reference aerial image is desired. UAV 105 is further instructed to navigate (e.g., descend) to a first altitude where unique identifiers (e.g., visual fiducial markers 180) is resolvable by onboard camera 303 of UAV 105.

In a process block 464, UAV 105 acquires an interim aerial image of the area with the multiple instances of the asset while UAV 105 is at the first altitude such that the unique identifier for each of the multiple instances is resolvable within the interim aerial image.

In a process block 466, multiple instances of the asset within the interim aerial image are identified and the interim aerial image is annotated to distinguish between each of the multiple instances of the asset. In some embodiments, segmentation module 315 is utilized such that image classifier 318 identifies each of the multiple instances of the asset and generates a plurality of interim bounding boxes, each encircling an individual asset included in the multiple instances of the asset within the interim aerial image. The interim bounding boxes are subsequently denoted by annotator 321 as corresponding to respective unique visual identifiers resolvable from the first altitude. In such an embodiment, the plurality of interim bounding boxes is configured to distinguish between the multiple instances of the asset based on the unique identifier for each of the multiple instances of the asset.

In a process block 468, UAV 105 is instructed to ascend to a subsequent altitude to acquire a subsequent aerial image. In some embodiments, process block 468 corresponds to process block 405 of FIG. 4A. In other words, the subsequent aerial image corresponds to a query aerial image while the previous aerial image (i.e., the interim aerial image that has been annotated) corresponds to a reference aerial image. In some embodiments, the query aerial image is acquired when UAV 105 is at a subsequent altitude greater than the first altitude. In some embodiments, the unique identifier for each of the multiple instances of the asset is not resolvable by UAV 105 at the second altitude. It is appreciated that techniques described herein may be scale invariant to a certain extent, but because environmental context is utilized to generate image features, there should be a certain amount of overlap between the reference aerial image and the query aerial image. Accordingly, in some embodiments, a difference between the first altitude (e.g., altitude interim aerial image or reference aerial image is taken) and the subsequent altitude (e.g., altitude subsequent aerial image or query aerial image is taken) is less than a threshold distance.

In a process block 470, corresponding pixels between the previous aerial image (e.g., the interim aerial image) and the subsequent aerial image is identified. In some embodiments, block 470 corresponds to blocks 415-430 of FIG. 4A. In other words, the same techniques utilized in blocks 415-430 are also utilized to determine corresponding pixels between the previous aerial image and the subsequent aerial image.

In a process block 472, a homography transformation describing a relationship between the interim aerial image and the subsequent aerial image is determined. In some embodiments, the same techniques utilized in block 435 of FIG. 1A are utilized to determine the homography transformation.

In a process block 474, the subsequent aerial image is annotated by mapping the annotated pixels of the previous aerial image to the subsequent aerial image. It is appreciated that in some embodiments, the same techniques utilized in block 440 of FIG. 4A are utilized to annotate the subsequent aerial image.

In a process block 476, a check is performed to determine if the altitude the subsequent image was captured by UAV 105 is sufficient. If the altitude is within a threshold altitude, then the annotated subsequent image is flagged as a reference aerial image and transmitted to remote server 204 as a new or updated reference aerial image for the area (e.g., process block 478). However, if the altitude is insufficient (e.g., outside of a threshold altitude), then process block 476 proceeds back to process block 468 and the process of acquiring a new aerial image at elevated altitude, identifying corresponding pixels between the previous and subsequent aerial images, determining an appropriate homography transformation, and annotating the subsequent aerial image occurs again. It is appreciated that this cascading process of using a previous image that has been annotated as a reference aerial image to annotate a subsequent or query aerial image is repeated until a reference aerial image (e.g., an annotated image) at a desired altitude is obtained.

FIG. 5 illustrates a reference aerial image 500 and a query aerial image 550 with a plurality of corresponding pixels mapped using a machine learning model, in accordance with an embodiment of the disclosure. Query aerial image 550 is not annotated and includes multiple instances of an asset (e.g., autoloaders 120). Reference aerial image 500 is annotated by bounding boxes 505 and 510 indicating an expected location and identity of autoloaders 120. It is appreciated that bounding box 510 shows an absence of autoloader 120. As discussed previously, techniques used herein do not require the actual presence of the multiple instances of an asset in the reference aerial so long as the reference aerial image is properly annotated to indicate an expected location and identification of the multiple instances of the asset. As illustrated in FIG. 5, a plurality of corresponding pixels 515, 520, and 525 are mapped (e.g., terminal ends of illustrated dashed lines) to indicate an expected correspondence between pixel locations of the reference aerial image 500 and the query aerial image 550. As discussed previously, the corresponding pixels (e.g., determined from matched image features), may include true correspondences (e.g., 515, 520) and false correspondences (e.g., 525). Accordingly, as described herein, outliers such as 525 would be filtered by feature filter 333 to generate a more accurate homography transformation.

Figure 6A:
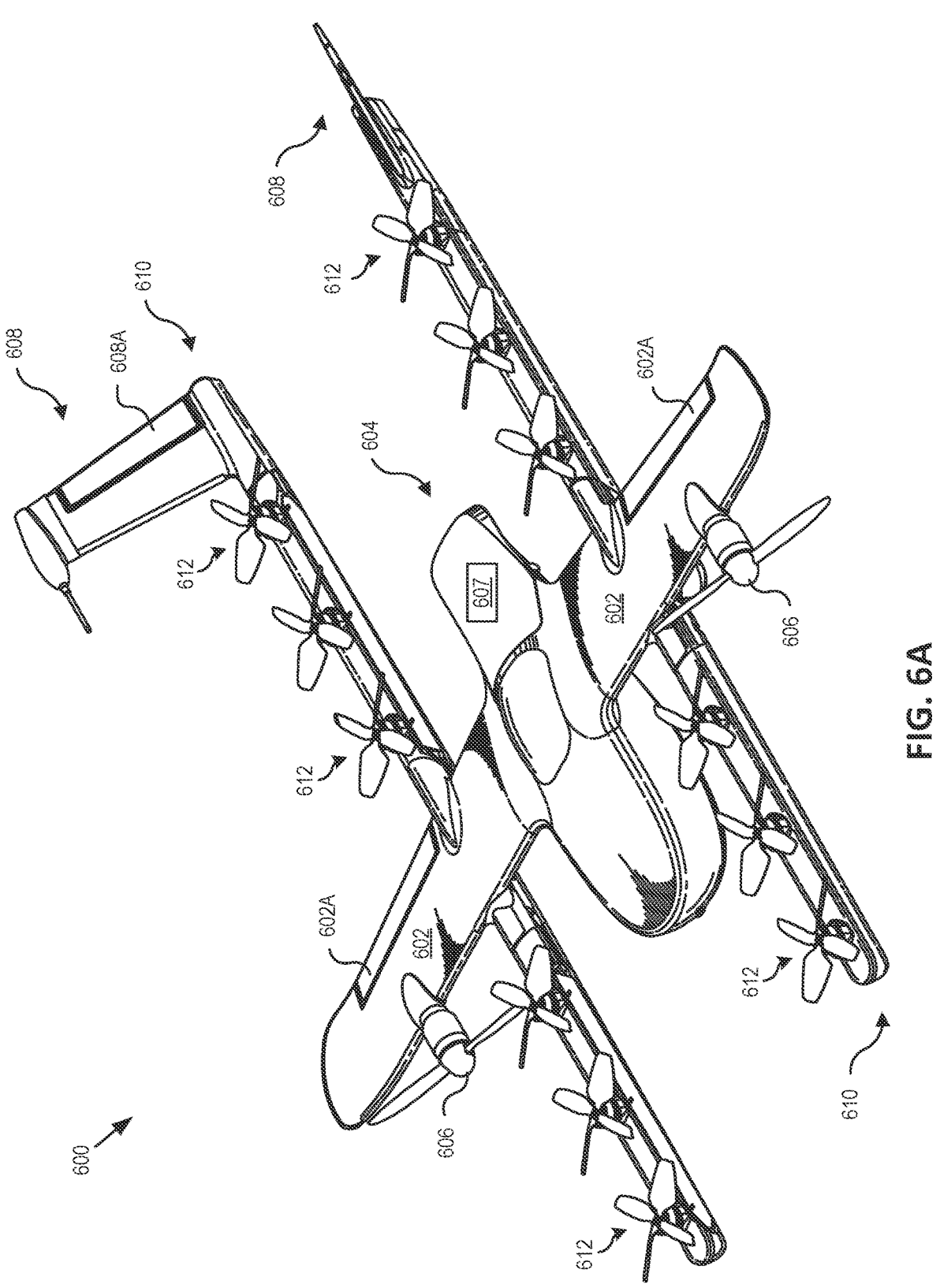
FIG. 6A is a perspective view illustration of a UAV configured for automated retrieval of packages from an autoloader, in accordance with an embodiment of the disclosure.
Figure 6B:
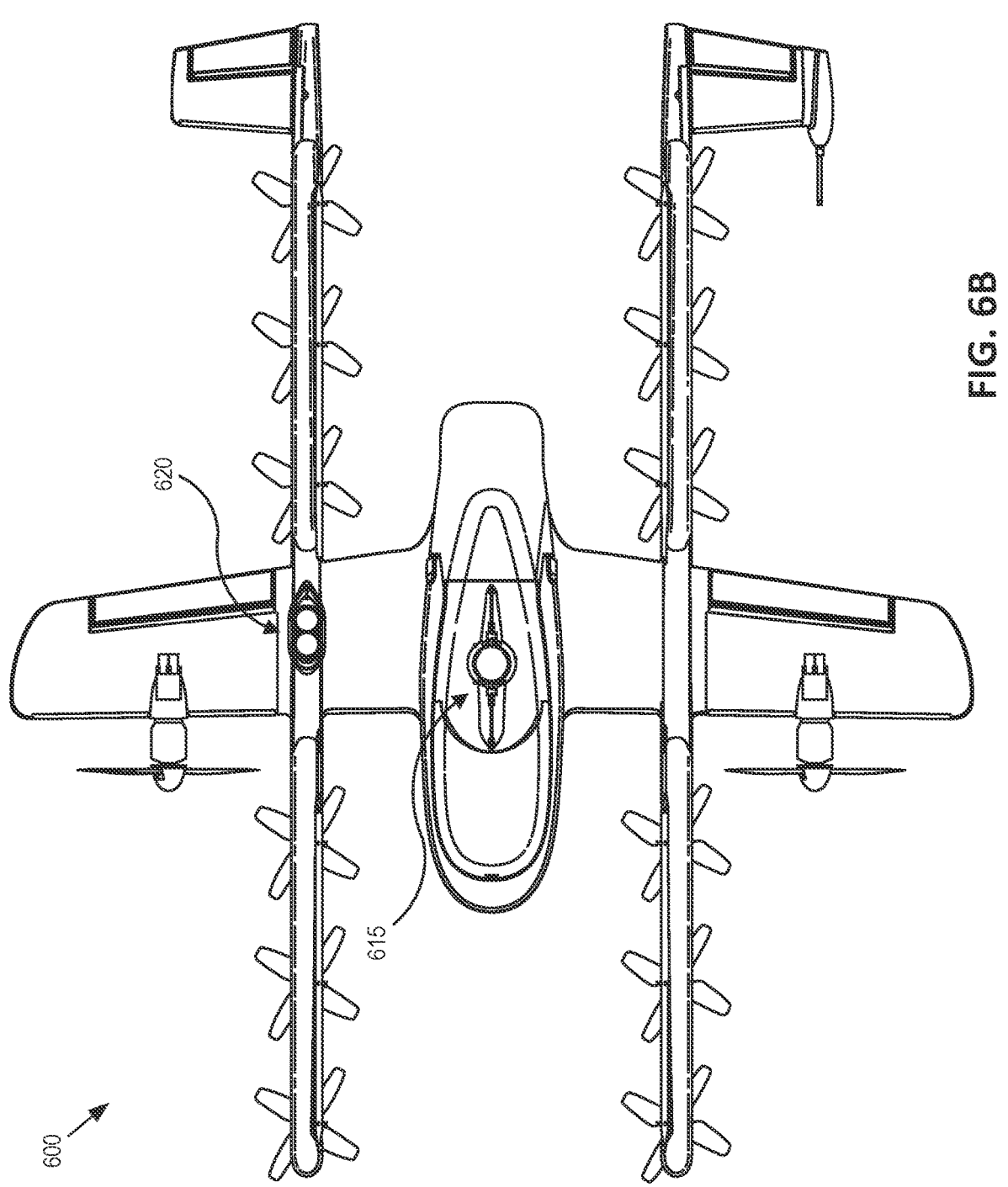
FIG. 6B is an underside plan view illustration of the UAV configured for automated retrieval of packages from an autoloader, in accordance with an embodiment of the disclosure.

FIGS. 6A and 6B illustrate an example UAV 600 that is well suited for delivery of packages, in accordance with an embodiment of the disclosure. FIG. 6A is a topside perspective view illustration of UAV 600 while FIG. 6B is a bottom side plan view illustration of the same. UAV 600 is one possible implementation of UAVs 105 illustrated in FIGS. 1A, 1B, and 2, although other types of UAVs may be implemented as well.

The illustrated embodiment of UAV 600 is a vertical takeoff and landing (VTOL) UAV that includes separate propulsion units 606 and 612 for providing horizontal and vertical propulsion, respectively. UAV 600 is a fixed-wing aerial vehicle, which as the name implies, has a wing assembly 602 that can generate lift based on the wing shape and the vehicle's forward airspeed when propelled horizontally by propulsion units 606. The illustrated embodiment of UAV 600 has an airframe that includes a fuselage 604 and wing assembly 602. In one embodiment, fuselage 604 is modular and includes a battery module, an avionics module, and a mission payload module. These modules are secured together to form the fuselage or main body.

The battery module (e.g., fore portion of fuselage 604) includes a cavity for housing one or more batteries for powering UAV 600. The avionics module (e.g., aft portion of fuselage 604) houses flight control circuitry of UAV 600, which may include a processor and memory, communication electronics and antennas (e.g., cellular transceiver, Wi-Fi transceiver, etc.), and various sensors (e.g., global positioning sensor, an inertial measurement unit, a magnetic compass, a radio frequency identifier reader, etc.). Collectively, these functional electronic subsystems for controlling UAV 600, communicating, and sensing the environment may be referred to as an onboard control system 607. The mission payload module (e.g., middle portion of fuselage 604) houses equipment associated with a mission of UAV 600. For example, the mission payload module may include a payload actuator 615 (see FIG. 6B) for dispensing and recoiling line 160 when picking up package 155 during a package delivery mission. In some embodiments, the mission payload module may include camera/sensor equipment (e.g., camera, lenses, radar, lidar, pollution monitoring sensors, weather monitoring sensors, scanners, etc.). In FIG. 6B, an onboard camera system 620 is mounted to the underside of UAV 600 to support a machine vision system (e.g., monovision frame camera, stereoscopic machine vision, event camera, lidar depth camera, etc.) for visual triangulation and navigation as well as operate as an optical code scanner for reading visual codes affixed to packages. These visual codes may be associated with or otherwise match to delivery missions and provide the UAV with a handle for accessing destination, delivery, and package validation information. Onboard camera 620 represents one possible implementation of onboard camera 303.

As illustrated, UAV 600 includes horizontal propulsion units 606 positioned on wing assembly 602 for propelling UAV 600 horizontally. UAV 600 further includes two boom assemblies 610 that secure to wing assembly 602. Vertical propulsion units 612 are mounted to boom assemblies 610. Vertical propulsion units 612 providing vertical propulsion. Vertical propulsion units 612 may be used during a hover mode where UAV 600 is descending (e.g., to a delivery location), ascending (e.g., at initial launch or following a delivery), or maintaining a constant altitude. Stabilizers 608 (or tails) may be included with UAV 600 to control pitch and stabilize the aerial vehicle's yaw (left or right turns) during cruise. In some embodiments, during cruise mode vertical propulsion units 612 are disabled or powered low and during hover mode horizontal propulsion units 606 are disabled or powered low.

During flight, UAV 600 may control the direction and/or speed of its movement by controlling its pitch, roll, yaw, and/or altitude. Thrust from horizontal propulsion units 606 is used to control air speed. For example, the stabilizers 608 may include one or more rudders 608A for controlling the aerial vehicle's yaw, and wing assembly 602 may include elevators for controlling the aerial vehicle's pitch and/or ailerons 602A for controlling the aerial vehicle's roll. While the techniques described herein are particularly well-suited for VTOLs providing an aerial delivery service, it should be appreciated that embodiments are not thus limited.

Many variations on the illustrated fixed-wing aerial vehicle are possible. For instance, aerial vehicles with more wings (e.g., an "x-wing" configuration with four wings), are also possible. Although FIGS. 6A and 6B illustrate one wing assembly 602, two boom assemblies 610, two horizontal propulsion units 606, and six vertical propulsion units 612 per boom assembly 610, it should be appreciated that other variants of UAV 600 may be implemented with more or less of these components.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of operation of an unmanned aerial vehicle (UAV), the method comprising:

acquiring a query aerial image with an onboard camera of the UAV and a reference aerial image, wherein the query aerial image includes multiple instances of an asset, and wherein the reference aerial image includes annotated pixels indicating an expected location and an identification for the multiple instances of the asset;

identifying a plurality of corresponding pixels between the query aerial image and the reference aerial image;

determining a homography transformation describing a relationship between the query aerial image and the reference aerial image based on the plurality of corresponding pixels;

annotating the query aerial image by mapping the annotated pixels of the reference aerial image to the query aerial image using the homography transformation to distinguish between a first instance of the asset included in the multiple instances of the asset and one or more other instances of the asset included in the multiple instances of the asset within the query aerial image; and instructing the UAV to perform an action associated with the first instance of the asset.

2. The method of claim 1, wherein the identifying the plurality of corresponding pixels further comprises:

extracting machine-learned image features from the query aerial image and the reference aerial image; and matching the machine-learned image features extracted from the query aerial image and the reference aerial image to identify the plurality of corresponding pixels.

3. The method of claim 2, wherein the identifying the plurality of corresponding pixels further comprises:

filtering outliers included in the matched machine-learned image features, wherein the homography transformation is determined using the matched machine-learned image features after filtering the outliers.

4. The method of claim 1, wherein individual pixels included in the plurality of corresponding pixels are respectively associated with machine-learned image features, wherein the machine-learned image features include environmental context of the reference aerial image and the query aerial image that extend beyond local information associated with the individual pixels.

5. The method of claim 1, wherein acquiring the reference aerial image comprises:

retrieving the reference aerial image from memory on the UAV; or receiving the reference aerial image from a remote server, wherein the reference aerial image and the query aerial image are representative of an area at different times, and wherein a first perspective of the reference aerial image is different from a second perspective of the query aerial image.

6. The method of claim 1, wherein the asset corresponds to an autoloading apparatus that is adapted to load a package onto a line deployed from the UAV or a charging pad adapted to charge a battery of the UAV.

7. The method of claim 6, wherein the action associated with the first instance of the asset includes navigating the UAV into alignment with the first instance when the asset corresponds to the autoloading apparatus or landing the UAV onto the first instance when the asset corresponds to the charging pad.

8. The method of claim 1, wherein the multiple instances of the asset each includes a respective fiducial marker resolvable from a first altitude by the UAV, wherein the respective fiducial marker for each of the multiple instances of the asset disambiguate between the multiple instances of the asset, and wherein the method further comprises:

navigating the UAV to an area including the multiple instances of the asset and descending to the first altitude;

acquiring an interim aerial image of the area with the onboard camera of the UAV while the UAV is at the first altitude such that the respective fiducial marker for each of the multiple instances of the asset is resolvable within the interim aerial image; and generating a plurality of interim bounding boxes, each encircling an individual asset included in the multiple instances of the asset within the interim aerial image, wherein the plurality of interim bounding boxes is configured to distinguish between the multiple instances of the asset based on the unique identifier for each of the multiple instances of the asset.

9. The method of claim 8, wherein the query aerial image is acquired when the UAV is at a second altitude greater than the first altitude, wherein the unique identifier for each of the multiple instances of the asset is not resolvable by the UAV at the second altitude, and wherein the interim aerial image corresponds to the reference aerial image when a difference between the first altitude and the second altitude is less than a threshold distance.

10. The method of claim 8, wherein the query aerial image is acquired when the UAV is at a second altitude greater than the first altitude, wherein the unique identifier for each of the multiple instances of the asset is not resolvable by the UAV at the second altitude, wherein the plurality of interim bounding boxes corresponds represent interim annotated pixels of the interim aerial image indicating the expected location and the identification of the multiple instances of the asset, and wherein the method further includes:

ascending the UAV to an intermediate altitude between the first altitude and the second altitude;

acquiring the reference aerial image of the area with the onboard camera of the UAV while the UAV is at the interim altitude;

identifying a plurality of interim corresponding pixels between the interim aerial image and the reference aerial image;

determining an interim homography transformation describing a relationship between the interim aerial image and the reference aerial image based on the plurality of interim corresponding pixels; and annotating the reference aerial image by mapping the interim annotated pixels of the interim aerial image to the reference aerial image using the interim homography transformation to generate the annotated pixels of the reference aerial image.

11. The method of claim 1, wherein the reference aerial image does not include one or more of the multiple instances of the asset.

12. The method of claim 1, further comprising generating a plurality of bounding boxes, each encircling an individual asset included in the multiple instances of the asset within the query aerial image, wherein the plurality of bounding boxes is configured to distinguish between the multiple instances of the asset based on the unique identifier for each of the multiple instances of the asset and the mapped annotated pixels of the reference aerial image.

13. At least one non-transitory computer-readable medium storing instructions that, when executed by a control system of an unmanned aerial vehicle (UAV), will cause the UAV to perform operations comprising:

acquiring a query aerial image with an onboard camera of the UAV and a reference aerial image, wherein the query aerial image includes multiple instances of an asset, and wherein the reference aerial image includes annotated pixels indicating an expected location and an identification for the multiple instances of the asset;

identifying a plurality of corresponding pixels between the query aerial image and the reference aerial image;

determining a homography transformation describing a relationship between the query aerial image and the reference aerial image based on the plurality of corresponding pixels;

annotating the query aerial image by mapping the annotated pixels of the reference aerial image to the query aerial image using the homography transformation to distinguish between a first instance of the asset included in the multiple instances of the asset and one or more other instances of the asset included in the multiple instances of the asset within the query aerial image; and instructing the UAV to perform an action associated with the first instance of the asset.

14. The at least one non-transitory computer-readable medium of claim 13, further storing instructions that, when executed by the control system, will cause the UAV to perform further operations, comprising:

extracting machine-learned image features from the query aerial image and the reference aerial image; and matching the machine-learned image features extracted from the query aerial image and the reference aerial image to identify the plurality of corresponding pixels.

15. The at least one non-transitory computer-readable medium of claim 14, further storing instructions that, when executed by the control system, will cause the UAV to perform further operations, comprising:

filtering outliers included in the matched machine-learned image features, wherein the homography transformation is determined using the matched machine-learned image features after filtering the outliers.

16. The at least one non-transitory computer-readable medium of claim 13, wherein individual pixels included in the plurality of corresponding pixels are respectively associated with machine-learned image features, wherein the machine-learned image features include environmental context of the reference aerial image and the query aerial image that extend beyond local information associated with the individual pixels.

17. The at least one non-transitory computer-readable medium of claim 13, further storing instructions that, when executed by the control system, will cause the UAV to perform further operations, comprising:

retrieving the reference aerial image from memory on the UAV; or receiving the reference aerial image from a remote server, wherein the reference aerial image and the query aerial image are representative of an area at different times, and wherein a first perspective of the reference aerial image is different from a second perspective of the query aerial image.

18. The at least one non-transitory computer-readable medium of claim 13, wherein the asset corresponds to an autoloading apparatus that is adapted to load a package onto a line deployed from the UAV or a charging pad adapted to charge a battery of the UAV, and wherein the action associated with the first instance of the asset includes navigating the UAV into alignment with the first instance when the asset corresponds to the autoloading apparatus or landing the UAV onto the first instance when the asset corresponds to the charging pad.

19. The at least one non-transitory computer-readable medium of claim 13, wherein the multiple instances of the asset each includes a respective fiducial marker resolvable from a first altitude by the UAV, wherein the respective fiducial marker for each of the multiple instances of the asset disambiguate between the multiple instances of the assets, and wherein the at least one non-transitory computer-readable medium further storing instructions that, when executed by the control system, will cause the UAV to perform further operations, comprising:

navigating the UAV to an area including the multiple instances of the asset and descending to the first altitude;

acquiring an interim aerial image of the area with the onboard camera of the UAV while the UAV is at the first altitude such that the unique identifier for each of the multiple instances of the asset is resolvable within the interim aerial image; and generating a plurality of interim bounding boxes, each encircling an individual asset included in the multiple instances of the asset within the interim aerial image, wherein the plurality of interim bounding boxes is configured to distinguish between the multiple instances of the asset based on the unique identifier for each of the multiple instances of the asset.

20. The at least one non-transitory computer-readable medium of claim 19, wherein the query aerial image is acquired when the UAV is at a second altitude greater than the first altitude, wherein the unique identifier for each of the multiple instances of the asset is not resolvable by the UAV at the second altitude, and wherein the interim aerial image corresponds to the reference aerial image when a difference between the first altitude and the second altitude is less than a threshold distance.

21. The at least one non-transitory computer-readable medium of claim 19, wherein the query aerial image is acquired when the UAV is at a second altitude greater than the first altitude, wherein the unique identifier for each of the multiple instances of the asset is not resolvable by the UAV at the second altitude, wherein the plurality of interim bounding boxes corresponds to interim annotated pixels of the interim aerial image indicating the expected location and the identification of the multiple instances of the asset, and wherein the at least one non-transitory computer-readable medium further storing instructions that, when executed by the control system, will cause the UAV to perform further operations, comprising:

ascending the UAV to an intermediate altitude between the first altitude and the second altitude;

acquiring the reference aerial image of the area with the onboard camera of the UAV while the UAV is at the interim altitude;

identifying a plurality of interim corresponding pixels between the interim aerial image and the reference aerial image;

determining an interim homography transformation describing a relationship between the interim aerial image and the reference aerial image based on the plurality of interim corresponding pixels; and annotating the reference aerial image by mapping the interim annotated pixels of the interim aerial image to the reference aerial image using the interim homography transformation to generate the annotated pixels of the reference aerial image.

22. The at least one non-transitory computer-readable medium of claim 13, wherein the reference aerial image does not include the multiple instances of the asset.

23. A method of operation of an unmanned aerial vehicle (UAV), the method comprising:

acquiring a query aerial image with an onboard camera of the UAV and a reference aerial image, wherein the query aerial image includes multiple instances of an asset, wherein the reference aerial image includes annotated pixels indicating an expected location and an identification for the multiple instances of the asset, and wherein the reference aerial image does not include one or more of the multiple instances of the asset;

identifying a plurality of corresponding pixels between the query aerial image and the reference aerial image;

determining a homography transformation describing a relationship between the query aerial image and the reference aerial image based on the plurality of corresponding pixels;

annotating the query aerial image by mapping the annotated pixels of the reference aerial image to the query aerial image using the homography transformation to disambiguate between a first instance of the asset included in the multiple instances of the asset and one or more other instances of the asset included in the multiple instances of the asset within the query aerial image; and instructing the UAV to perform an action associated with the first instance of the asset.

24. The method of claim 1, wherein the query aerial image is a downward facing aerial image.

* * * * *